United States Patent
Peng et al.

(10) Patent No.: US 10,985,564 B2
(45) Date of Patent: Apr. 20, 2021

(54) ELECTRIC POWER-REGULATING SYSTEM AND METHOD THEREOF

(71) Applicant: Industrial Technology Research Institute, Hsin-Chu (TW)

(72) Inventors: Ming-Tsan Peng, Taoyuan County (TW); Huan-Lung Gu, Hualien County (TW); Chia-Lin Wu, Kaohsiung (TW)

(73) Assignee: INDUSTRIAL TECHNOLOGY RESEARCH INSTITUTE, Hsin-Chu (TW)

( * ) Notice: Subject to any disclaimer, the term of this patent is extended or adjusted under 35 U.S.C. 154(b) by 66 days.

(21) Appl. No.: 16/214,439

(22) Filed: Dec. 10, 2018

(65) Prior Publication Data

US 2020/0119558 A1 Apr. 16, 2020

(30) Foreign Application Priority Data

Oct. 16, 2018 (TW) .................................. 107136358

(51) Int. Cl.
*H02J 3/30* (2006.01)
*F03G 3/08* (2006.01)
(Continued)

(52) U.S. Cl.
CPC .................. *H02J 3/30* (2013.01); *F03G 3/08* (2013.01); *H02J 3/1821* (2013.01); *H02J 9/06* (2013.01); *H02K 7/025* (2013.01)

(58) Field of Classification Search
CPC ...... H02K 7/02; H02J 7/14; H02J 3/00; H02J 3/39; H02J 3/38; H02J 11/00; H02J 1/10; F02C 6/00; H02P 9/04; H02P 9/48
(Continued)

(56) References Cited

U.S. PATENT DOCUMENTS 6,614,132 B2 9/2003 Hockney et al.
6,639,370 B1 10/2003 Gabrys
(Continued)

FOREIGN PATENT DOCUMENTS

CN 101090202 12/2007
CN 102751719 A 10/2012
(Continued)

OTHER PUBLICATIONS

TW OA dated Aug. 6, 2019.
(Continued)

*Primary Examiner* — Nguyen Tran
*Assistant Examiner* — Jagdee S Dhillon
(74) *Attorney, Agent, or Firm* — WPAT, PC

(57) ABSTRACT

An electric power-regulating system includes an electric-load end, a power-supply end, a power regulator, a DC-bus device, a flywheel energy-storage device, a switch device and a controller. The flywheel energy-storage device connects the DC-bus device. The switch device is connected between the flywheel energy-storage device and the DC-bus device. The switch device provides at least one current-flow direction between the DC-bus device and the flywheel energy-storage device. The controller controls the power regulator and the flywheel energy-storage device. When a voltage of the DC-bus device exceeds a operation range, the controller selectively limits the current-flow direction of the switch device. Further, when a voltage-bias direction of the switch device and the current-flow direction are the same, the controller allows a current of the DC-bus device to flow into or out of the flywheel energy-storage device in the current-flow direction. In addition, an electric power-regulating method is also provided.

15 Claims, 6 Drawing Sheets

(51) Int. Cl.
*H02J 9/06* (2006.01)
*H02J 3/18* (2006.01)
*H02K 7/02* (2006.01)

(58) Field of Classification Search
USPC ...... 307/68, 46, 48, 64, 85, 87, 86; 318/161, 318/800, 801, 802, 434; 322/4; 363/34; 290/1 R
See application file for complete search history.

(56) References Cited

U.S. PATENT DOCUMENTS

| | | | | |
|---|---|---|---|---|
| 6,720,674 | B1* | 4/2004 | Gabrys | H02J 9/066 307/68 |
| 9,099,938 | B2 | 8/2015 | Ilic et al. | |
| 9,556,852 | B2 | 1/2017 | Babazadeh et al. | |
| 2002/0163819 | A1* | 11/2002 | Treece | H01M 8/0662 363/34 |
| 2002/0198648 | A1* | 12/2002 | Gilbreth | H02J 1/14 701/100 |
| 2004/0245783 | A1* | 12/2004 | Gilbreth | H02J 1/10 290/52 |
| 2005/0012395 | A1* | 1/2005 | Eckroad | H02J 3/16 307/44 |
| 2005/0077881 | A1* | 4/2005 | Capp | H02J 3/30 322/29 |
| 2009/0134705 | A1* | 5/2009 | Kalev | H02K 7/025 307/68 |
| 2009/0152874 | A1* | 6/2009 | Kalev | H02K 7/025 290/1 R |
| 2012/0187922 | A1* | 7/2012 | Dubois | F16F 15/305 322/4 |
| 2016/0118859 | A1* | 4/2016 | Schafer | H02J 1/10 307/84 |
| 2016/0308362 | A1* | 10/2016 | Jung | H02M 3/04 |
| 2017/0194791 | A1 | 7/2017 | Budde | |
| 2017/0237255 | A1 | 8/2017 | Inam et al. | |
| 2019/0055890 | A1* | 2/2019 | Ethier | F02C 9/56 |

FOREIGN PATENT DOCUMENTS

| | | | |
|---|---|---|---|
| CN | 102780230 | 11/2012 | |
| CN | 105846511 | 8/2016 | |
| CN | 105914768 A | 8/2016 | |
| CN | 206878548 | 1/2018 | |
| TW | 571479 | 1/2004 | |
| TW | M331839 | 5/2008 | |
| TW | 201232993 | 8/2012 | |
| TW | 201610658 | 3/2016 | |
| TW | I530074 | 4/2016 | |
| TW | 201639265 | 11/2016 | |
| WO | WO-2019209110 A1 * | 10/2019 | H02J 15/00 |

OTHER PUBLICATIONS

Sebastian et al. "Control and simulation of a flywheel energy storage for a wind diesel power system", Electrical Power and Energy Systems 64 (2015) 1049-1056.
Diaz-Gonzalez et al. "Control of a Flywheel Energy Storage System for Power Smoothing in Wind Power Plants", IEEE Transactions on Energy Conversion, vol. 29, No. 1, Mar. 2014.
Ghanaatian et al. "Control of Flywheel Energy Storage Systems in Presence of Uncertainties", IEEE Transactions on Sustainable Energy 2018.
Dragicevic et al. "Modeling and Control of Flexible HEV Charging Station upgraded with Flywheel Energy Storage", 2014 IEEE.
Amiryar et al. "A Review of Flywheel Energy Storage System Technologies and Their Applications", Appl. Sci. 2017, 7, 286, www/mdpi.com/journal/applsci.
Kenny et al. "Control of a High Speed Flywheel System for Energy Storage in Space Applications", IEEE Transactions on Industry Applications, vol. 41, No. 4, Jul./Aug. 2005.

* cited by examiner

ELECTRIC POWER-REGULATING SYSTEM AND METHOD THEREOF

CROSS REFERENCE TO RELATED APPLICATION

This application claims the benefits of Taiwan application Serial No. 107136358, filed on Oct. 16, 2018, the disclosures of which are incorporated by references herein in its entirety.

TECHNICAL FIELD

The present disclosure relates in general to an electric power-regulating system and a method thereof.

BACKGROUND

In the art, flywheel energy storage is one of energy storage techniques that stores the electric energy into a high-speed rotating flywheel in a format of mechanical energy. Generally, a typical flywheel device is consisted of supportive bearings, electric machinery, a protective casing and a power converter circuit. Thus, the flywheel energy storage utilizes the flywheel to fulfill a system that can store the electric energy and perform conversion between the mechanical energy and the electric energy. The system introduces a motor to convert the electric energy into the mechanical energy to be stored in a high-speed rotating flywheel. Upon a need of electricity, the flywheel would drive a generator to produce the required electricity. Namely, energy storage and release can be easily achieved through acceleration and deceleration of the flywheel.

Definitely, a single flywheel energy-storage unit can only provide a limited capacity for energy storage, and thus is unable to meet a demand of a large information center for an uninterruptible power system. Hence, a flywheel energy-storage array is developed to include a plurality of the flywheel energy-storage units, so that more storage capacity can be obtained. However, to the flywheel energy-storage array having a plurality of flywheels, a systematic and balanced control upon the flywheel energy-storage array is necessary. Currently, methods for controlling the flywheel energy-storage array include an equal-torque discharging method, an equal-power discharging method and an equal-time discharging method. Thereby, efficiency and flexibility in managing the flywheel energy can be enhanced.

In the art, a static switch is introduced to promote the control independence of each flywheel. However, in using the static switch, precise control timing is necessary. Since the static switch provides only a close state and an open state, so strict operational-state monitoring upon the close/open timing is crucial, or a system error could be inevitable. In addition, while the static switch is applied to the system, the complexity of system would be increased due that some devices of the system and the flywheel energy-storage array may be connected with a common DC bus. Since electric energy exchange among these devices always exists, the close/open timing of the static switch can't be accurately controlled. Consequently, a DC capacitor would experience unstable charging for a substantial time, from which the flywheel as well as the associated devices might function abnormally so as to affect the electric quality of the grid. In addition, while the voltage of the DC bus is abnormal, the system may force the flywheel energy-storage array or a specific flywheel to be offline from the grid. However, such a resort implies that a termination of energy supply from the flywheel is inevitable, and the quality in electricity supply of the grid would be reduced.

Thus, it is urgent and necessary in the art to provide an improved electric power-regulating system and method thereof for lessening the aforesaid situations.

SUMMARY

An object of the present disclosure is to provide an electric power-regulating system and method thereof to resolve aforesaid system instability caused by irregular charging/discharging of the flywheel energy-storage device during a period of unstable voltages at the DC bus.

According to one embodiment of this disclosure, an electric power-regulating system includes an electric-load end, a power-supply end, a power regulator, a DC-bus device, at least one flywheel energy-storage device, at least one switch device and a controller. The power-supply end is used for providing a power to the electric-load end. The power regulator is used for regulating the power of the power-supply end. The DC-bus device is connected with the power regulator. The at least one flywheel energy-storage device is connected with the DC-bus device. The at least one switch device is connected between the at least one flywheel energy-storage device and the respective DC-bus device. Each of the at least one switch device is used for providing at least one current-flow direction between the DC-bus device and the corresponding at least one flywheel energy-storage device. The controller is used for controlling the power regulator and the at least one flywheel energy-storage device. When a voltage of the DC-bus device exceeds a operation range, the controller selectively limits the at least one current-flow direction of the at least one switch device. Further, when a voltage-bias direction of the at least one switch device and the corresponding at least one current-flow direction are the same, the controller allows a current of the DC-bus device to flow into or out of the respective at least one flywheel energy-storage device in the at least one current-flow direction.

According to another embodiment of this disclosure, an electric power-regulating method includes the steps of: (a) detecting a voltage of a DC-bus device; (b) if the voltage of the DC-bus device exceeds an operation range, determining whether or not the voltage of the DC-bus device is less than a lower bound of the operation range; (c) if the voltage of the DC-bus device is less than the lower bound of the operation range, controlling at least one current-flow direction of the at least one flywheel energy-storage device in an acceleration mode, or, if the voltage of the DC-bus device is larger than the lower bound of the operation range, controlling the at least one current-flow direction of the at least one flywheel energy-storage device in an deceleration mode; and (d) determining whether or not a voltage-bias direction of at least one switch device and the corresponding at least one current-flow direction are the same; if positive, allowing a current of the DC-bus device to flow into or out of the at least one flywheel energy-storage device in the at least one current-flow direction.

As stated above, the electric power-regulating system and the method thereof provided by this disclosure would limit the accessibility of the capacitor energy of the DC-bus device upon unstable voltages at the DC-bus device, such that the flywheel energy-storage device can accelerate as normal but with a smaller acceleration rate. Thereupon, the speed in accessing the capacitor energy would be reduced, without sacrificing the stability of the DC-bus device and the associated devices. Also, the continuity of the flywheel energy-storage device can be upheld to provide foreign power from the power-supply end, such that better power quality at the power-supply end can be assured, and thereby the aforesaid shortcoming in system instability caused by irregular charging/discharging of the flywheel energy-storage device during a period of unstable voltages at the DC-bus device can be substantially resolved.

Further scope of applicability of the present application will become more apparent from the detailed description given hereinafter. However, it should be understood that the detailed description and specific examples, while indicating exemplary embodiments of the disclosure, are given by way of illustration only, since various changes and modifications within the spirit and scope of the disclosure will become apparent to those skilled in the art from this detailed description.

BRIEF DESCRIPTION OF THE DRAWINGS

The present disclosure will become more fully understood from the detailed description given herein below and the accompanying drawings which are given by way of illustration only, and thus are not limitative of the present disclosure and wherein.

DETAILED DESCRIPTION

Figure 1A:
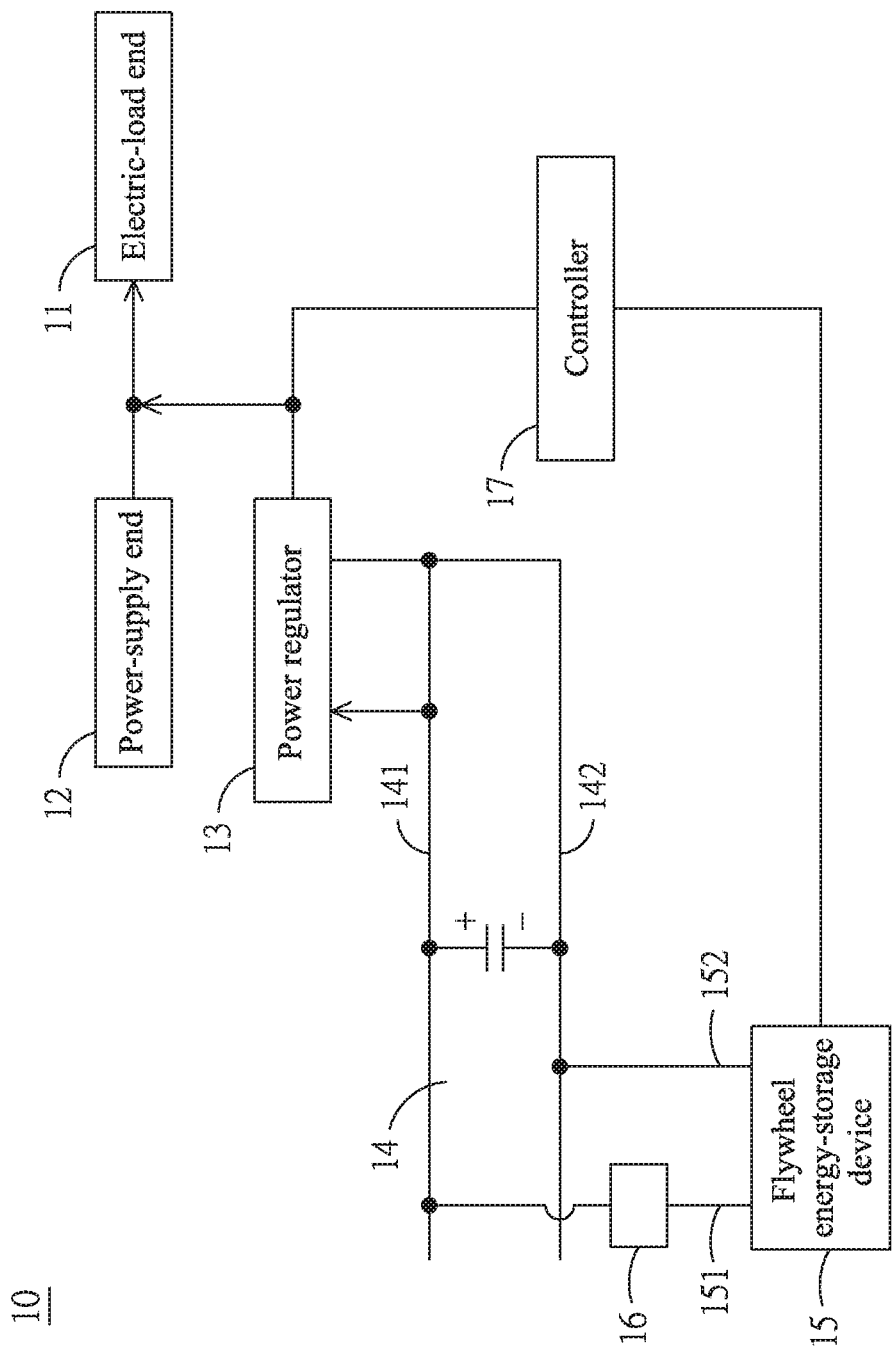
FIG. 1A is a schematic view of an embodiment of the electric power-regulating system in accordance with this disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Figure 1B:
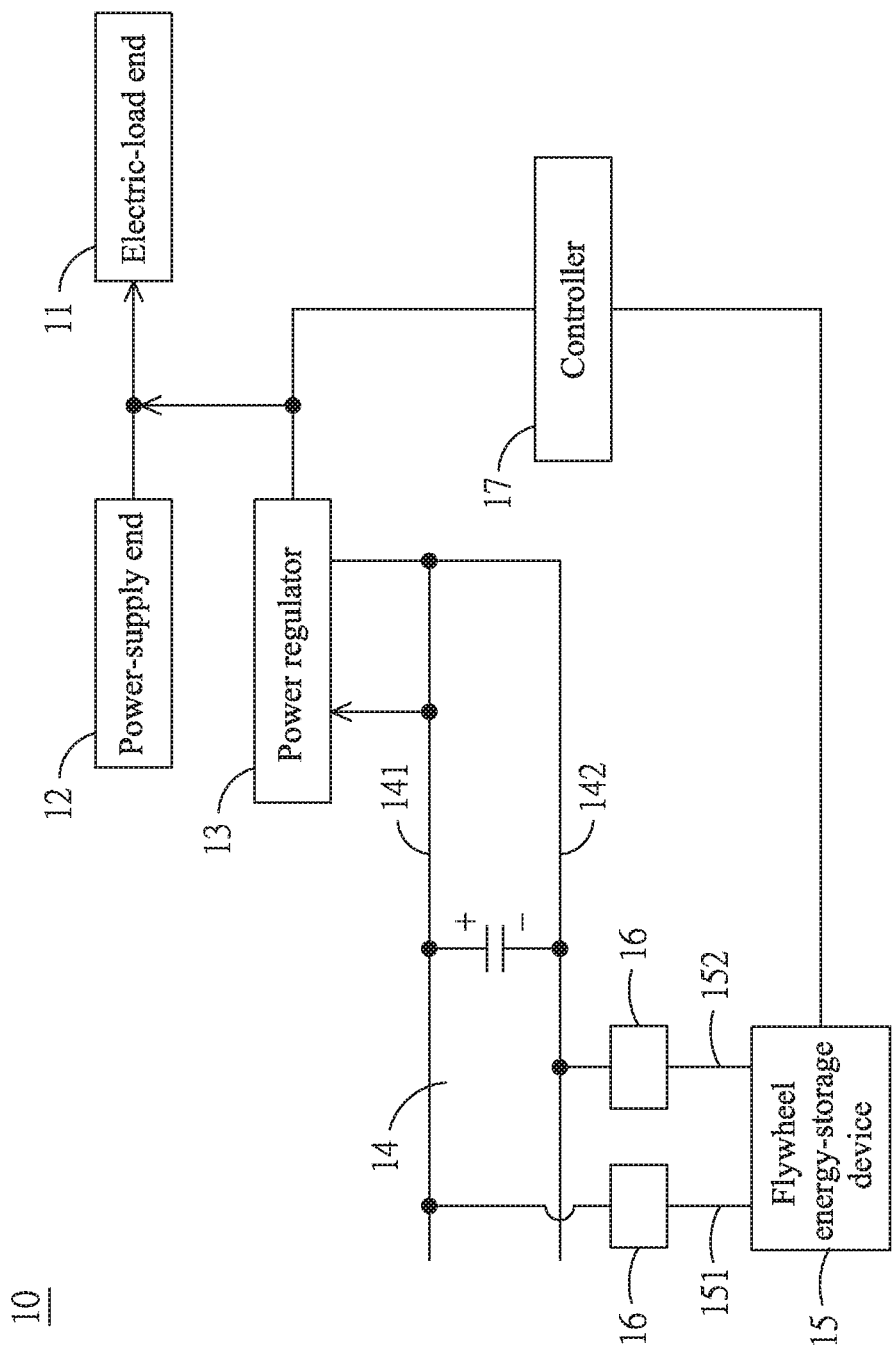
FIG. 1B is a schematic view of another embodiment of the electric power-regulating system in accordance with this disclosure.
Figure 1C:
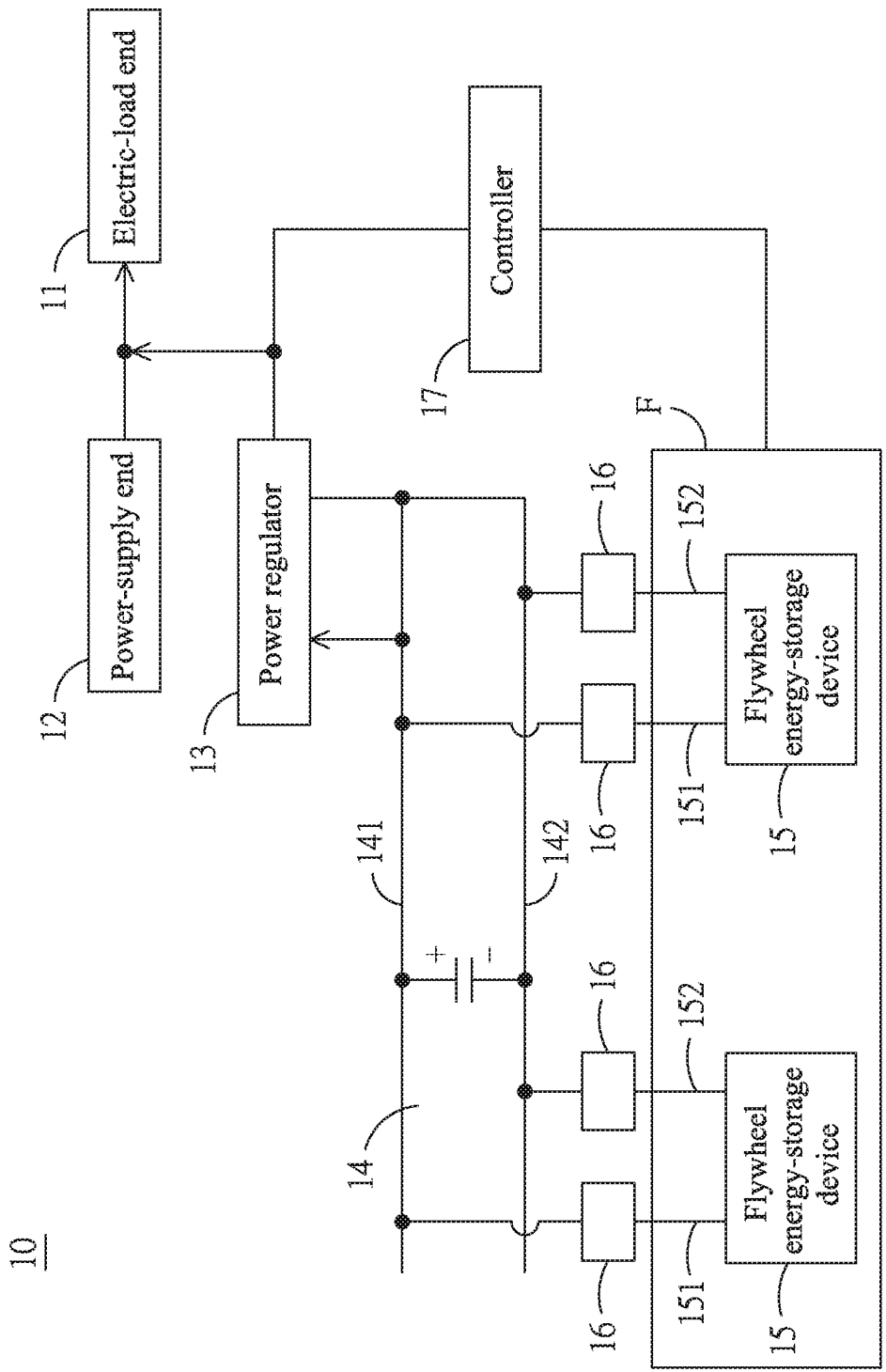
FIG. 1C is a schematic view of a further embodiment of the electric power-regulating system in accordance with this disclosure.

Referring to FIG. 1A, FIG. 1B and FIG. 1C, three embodiments of the electric power-regulating system in accordance with this disclosure are shown, respectively. As shown in FIG. 1A, the electric power-regulating system 10 includes an electric-load end 11, a power-supply end 12, a power regulator 13, a DC-bus device 14, a flywheel energy-storage device 15, a switch device 16 and a controller 17.

In this embodiment, the electric-load end 11 can be an appliance load, and the power-supply end 12 is to energize the electric-load end 11. In this disclosure, the power-supply end 12 can be a grid, a municipal power, a renewable energy, a multi-source energy or any the like. The renewable energy can be a natural energy such as a solar energy, a wind power, a tidal energy or a geothermal energy. The multi-source energy is provided by an energy-supply system consisted of several independent energy sources. The power regulator 13 is used for regulating the power at the power-supply end 12.

In this embodiment, the power regulator 13 has a half-bridge circuit for regulating the power at the power-supply end 12. The power regulator 13 can be an uninterruptible power system (UPS) for maintaining normal operations of the connected appliances by continuously supplying backup AC power while the power-supply end is abnormal (for example, a power failure, an under voltage, an interference or an electric surge). In some other embodiments, the power regulator 13 can be a static synchronous compensator (STATCOM) for dynamically regulating the power provided by the power-supply end 12, stabilizing the system, and increasing capacity in electric transmission. The DC-bus device 14, connected with the power regulator 13, can be simply a DC bus consisted of a positive end 141 and a negative end 142. A DC end of the half-bridge circuit of the power regulator 13 is electrically coupled individually with the positive end 141 and the negative end 142. The power regulator 13 can draw a capacitor energy of the DC-bus device 14 so as to regulate the power of the power-supply end 12.

Figure 2:
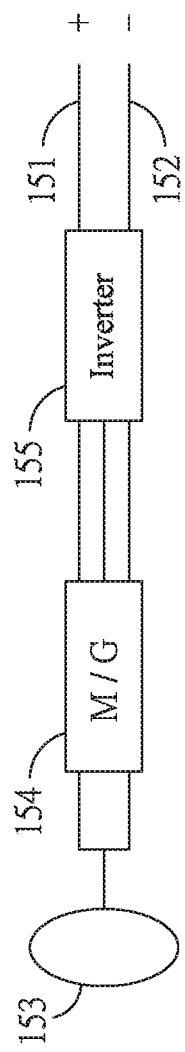
FIG. 2 is a schematic view of an embodiment of the flywheel energy-storage device in accordance with this disclosure.

In this embodiment, the flywheel energy-storage device 15 is connected with the DC-bus device 14. In detail, a DC positive end 151 of the flywheel energy-storage device 15 is connected with the positive end 141 of the DC-bus device 14, while a DC negative end 152 of the flywheel energy-storage device 15 is connected with the negative end 142 of the DC-bus device 14. As shown in FIG. 2, an embodiment of the flywheel energy-storage device is schematically shown. The flywheel energy-storage device 15 includes the DC positive end 151, the DC negative end 152, a flywheel rotor 153, an electric machinery 154 and an inverter 155. It shall be explained that, in FIG. 2, the letter M of the electric machinery 154 stands for a motor, and the letter G thereof stands for a generator. The electric machinery 154 is connected with the flywheel rotor 153 at one side and the inverter 155 at another side. The inverter 155 as a three-phase inverter has the DC positive end 151 and the DC negative end 152 connected at a side of the inverter 155 by opposing the electric machinery 154. The flywheel energy-storage device 15 can capture the capacitor energy of the DC-bus device 14 via the DC positive end 151. The inverter 155 can invert the DC power into an AC power so as to accelerate the electric machinery 154. The electric machinery 154 drives the flywheel rotor 153 to accelerate in an acceleration mode, so that the electric energy can be stored in a form of mechanical energy. On the other hand, the flywheel rotor 153 would decelerate in a deceleration mode so as to transform the mechanical energy into the electric energy. The inverter 155 then inverts the AC power transmitted from the electric machinery 154 into the DC power, so that the flywheel energy-storage device 15 discharges the energy to the DC-bus device 14. Thereupon, in this embodiment, the flywheel energy-storage device 15 can fulfill energy storage and release through the acceleration and deceleration of the flywheel rotor 153, respectively. It shall be explained that, in both FIG. 1A and FIG. 1B, the number of the flywheel energy-storage device 15 is one. However, in some other embodiments, more than two flywheel energy-storage devices 15 can be included to form a flywheel energy-storage array F; for example, two shown in FIG. 1C.

Refer now back to FIG. 1A. In this embodiment, the switch device 16, connected between the flywheel energy-storage device 15 and the DC-bus device 14, is to define at least one current-flow direction (for example, a first current-flow direction L1 and a second current-flow direction L2 in FIG. 3) between the DC-bus device 14 and the corresponding flywheel energy-storage device 15. It shall be explained that, in FIG. 1A, the switch device 16 is connected to the DC positive end 151 of the flywheel energy-storage device 15, while the DC negative end 152 of the flywheel energy-storage device 15 is not directly connected with the switch device 16. In some other embodiments, as shown in FIG. 1B or FIG. 1C, a plurality of the switch devices 16 in pairs are included. To each of the flywheel energy-storage devices 15, a pair of the switch devices 16 are connected. One of the pair of the switch devices 16 is connected to the DC positive end 151 of the corresponding flywheel energy-storage device 15, while another switch device 16 of the same pair is connected to the DC negative end 152 of the corresponding flywheel energy-storage device 15. Further, each of the pair of the switch devices 16 is operated independently. Namely, the operational state of the switch device 16 at the DC positive end 151 and that at the DC negative end 152 are not correlated in operations.

Figure 3:
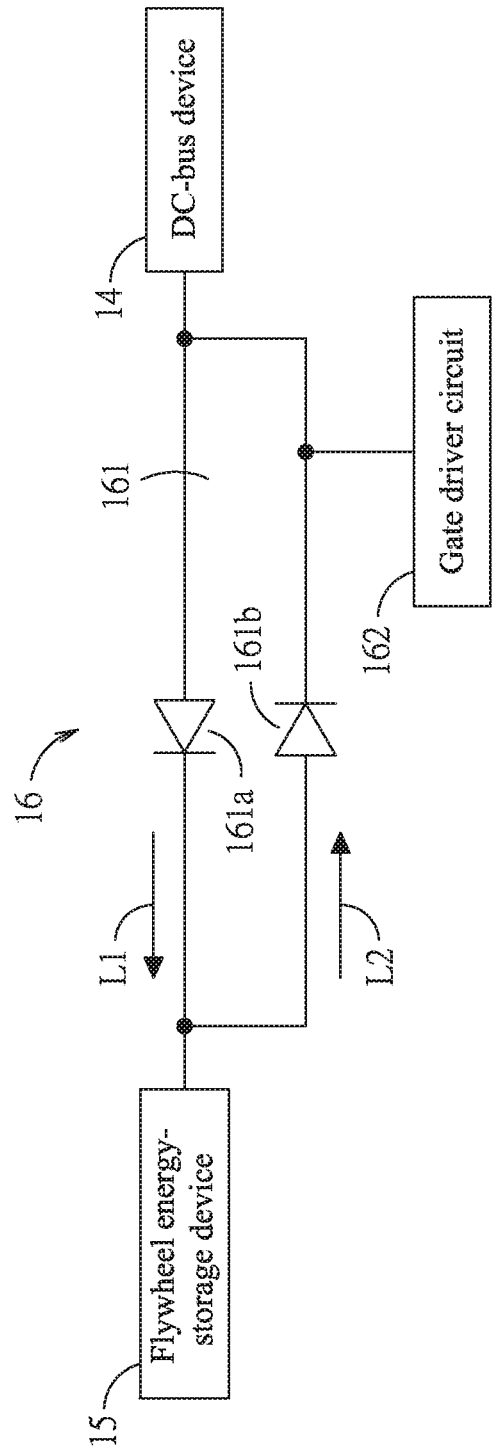
FIG. 3 is a schematic view of an embodiment of the switch device in accordance with this disclosure.

Practically, as shown in FIG. 3, an embodiment of the switch device in this disclosure is schematically shown. The switch device 16 includes a current circuit 161 and a gate driver circuit 162. The current circuit 161 includes two thryristors 161a, 161b arranged in antiparallel, and the gate driver circuit 162 is used for controlling on/off of the thryristors 161a, 161b. As shown in FIG. 3, the first thryristor 161a and the second thryristor 161b are electrically coupled in antiparallel to form the current circuit 161, by providing the first current-flow direction L1 and the second current-flow direction L2, respectively. In particular, the first current-flow direction L1 is a reverse direction of the second current-flow direction L2. A current of the DC-bus device 14 can flow into the flywheel energy-storage device 15 in the first current-flow direction L1. The first thryristor 161a is assigned as a positive thryristor. On the other hand, a current of the flywheel energy-storage device 15 can flow into the DC-bus device 14 in the second current-flow direction L2. The second thryristor 161b is assigned as a reverse thryristor. However, according to this disclosure, the current circuit may be consisted of diodes and switches.

Referring back to FIG. 1A, for simplification in circuiting, the power regulator 13 and the flywheel energy-storage device 15 can use the same DC-bus device 14. Thereupon, the power regulator 13 and the flywheel energy-storage device 15 can access individually the capacitor energy of the DC-bus device 14. The controller 17 for controlling the power regulator 13 and the flywheel energy-storage device 15 is to detect a voltage of the DC-bus device 14. When a voltage of the DC-bus device 14 exceeds an operation range, the controller 17 would selectively limit at least one current-flow direction of the switch devices 16. As a voltage-bias direction of the switch device 16 and the corresponding at least one current-flow direction are in the same direction, the controller 17 would allow the current of the DC-bus device 14 to flow into or out of the respective flywheel energy-storage device 15 according to the at least one current-flow direction (for example, by switching on/off a DC gate circuit).

For example, as shown in FIG. 3, within the operation range, the power regulator 13 (see FIG. 1A) and the flywheel energy-storage device 15 can access the capacitor energy of the DC-bus device 14. With the switch device 16 to be close in both the first current-flow direction L1 and the second current-flow direction L2, then the thryristors of the switch device 16 would allow bidirectional currents. It shall be explained that the aforesaid bidirectional currents include the current flowing in the first current-flow direction L1 and the current flowing in the second current-flow direction L2. The current of the DC-bus device 14 would flow into the flywheel energy-storage device 15 in the first current-flow direction L1, or the current of the flywheel energy-storage device 15 flows into the DC-bus device 14 in the second current-flow direction L2.

In this embodiment, as shown in FIG. 1A, when the voltage of the DC-bus device 14 exceeds an operation range, and if the flywheel energy-storage device 15 is in the acceleration mode, then, to the DC positive end 151 of the flywheel energy-storage device 15, the controller 17 would issue the gate driver circuit 162 a signal to cut off the second current-flow direction L2. Then, the gate driver circuit 162 would cut off the second current-flow direction L2 accordingly, so that the current of the DC-bus device 14 can flow only in the first current-flow direction L1. Namely, the switch device 16 connected with the DC positive end 151 would limit the current to flow from the DC-bus device 14 to the inverter 155 of the flywheel energy-storage device 15. In addition, if the voltage-bias direction of the switch device 16 demonstrates a positive bias to be in the same direction to the first current-flow direction L1, the controller 17 would allow the current of the DC-bus device 14 to follow the first current-flow direction L1 to the flywheel energy-storage device 15. In other words, in this situation, the first thryristor 161a of the switch device 16 would allow the current to flow to the flywheel energy-storage device 15, while the second thryristor 161b of the switch device 16 would open the circuit to reject the current flow. At this time, the original bidirectional current at the current circuit 161 would now become a unidirectional current, so that the energy accessibility through the DC-bus device 14 is limited. Under this circumstance, though the flywheel energy-storage device 15 may still accelerate as normal, yet the acceleration rate would be much smaller, so that the related energy variation would be reduced without sacrificing the operational stability of the DC-bus device 14 and the associated devices. Also, in this state, the flywheel energy-storage device 15 can still continuously provide power to the power-supply end 12, and thus the aforesaid shortcoming in system instability caused by irregular charging/discharging of the flywheel energy-storage device 15 during a period of unstable voltages at the DC-bus device 14 can be substantially resolved. On the other hand, if the voltage-bias direction of the switch device 16 demonstrates a negative bias, the controller 17 would not allow the current of the DC-bus device 14 to follow the first current-flow direction L1 to the flywheel energy-storage device 15. In other words, both the first thryristor 161a and the second thryristor 161b of the switch device 16 reject the current flow, such that the energy accessibility through the DC-bus device 14 at the DC positive end 151 of the flywheel energy-storage device 15 in the acceleration mode would be completely inhibited by the switch device 16. Similarly, to the DC negative end 152 of the flywheel energy-storage device 15 as shown in FIG. 1A, since no switch device 16 exists at the DC negative end 152 of the flywheel energy-storage device 15, thus the current of the flywheel energy-storage device 15 would continue to charge the capacitor of the DC-bus device 14.

In this embodiment, as shown in FIG. 1A, when the voltage of the DC-bus device 14 exceeds an operation range, and if the flywheel energy-storage device 15 is in the deceleration mode, then, to the DC positive end 151 of the flywheel energy-storage device 15, the controller 17 would issue the gate driver circuit 162 a signal to cut off the first current-flow direction L1. Then, the gate driver circuit 162 would cut off the first current-flow direction L1 accordingly, so that the current of the DC-bus device 14 can flow only in the second current-flow direction L2. Namely, the switch device 16 connected with the DC positive end 151 would limit the current to flow from the inverter 155 of the flywheel energy-storage device 15 to the DC-bus device 14. In addition, if the voltage-bias direction of the switch device 16 demonstrates a positive bias to be in the same direction to the second current-flow direction L2, the controller 17 would allow the current of the flywheel energy-storage device 15 to follow the second current-flow direction L2 to the DC-bus device 14. In other words, in this situation, the second thryristor 161b of the switch device 16 would allow the current to flow to the DC-bus device 14, while the first thryristor 161a of the switch device 16 would open the circuit to reject the current flow. At this time, the original bidirectional current at the current circuit 161 would now become a unidirectional current, so that the operational stability of the DC-bus device 14 and the associated devices can be assured. Under this circumstance, the flywheel energy-storage device 15 can still continuously provide power to the power-supply end 12, and thus the aforesaid shortcoming in system instability caused by irregular charging/discharging of the flywheel energy-storage device 15 during a period of unstable voltages at the DC-bus device 14 can be substantially resolved. On the other hand, if the voltage-bias direction of the switch device 16 demonstrates a negative bias, the controller 17 would not allow the current to follow the second current-flow direction L2 to the DC-bus device 14.

In another embodiment, as shown in FIG. 1B, a pair of the switch devices 16 are included in this electric power-regulating system 10. One of the switch devices 16 is connected with the DC positive end 151 of the flywheel energy-storage device 15, while another switch device 16 thereof is connected with the DC negative end 152 of the same flywheel energy-storage device 15. It shall be explained that the electric power-regulating system 10 of FIG. 1B and that of FIG. 1A are largely similar to each other. In these two embodiments, elements with the same function would be denoted by the same name and the same number, and thus details thereabout would be omitted herein. Within the operation range, the power regulator 13 and the flywheel energy-storage device 15 can access individually the capacitor energy of the DC-bus device 14, in which both the first current-flow direction L1 and the second current-flow direction L2 of each the switch device 16 are feasible. Namely, the thryristors of the switch device 16 allow bidirectional currents. When a voltage of the DC-bus device 14 exceeds the operation range, and if the flywheel energy-storage device 15 is in the acceleration mode, then, the controller 17 would issue the gate driver circuit 162 a signal to alternately cut off the first current-flow direction and the second current-flow direction L2. Then, the gate driver circuit 162 would cut off the first current-flow direction L1 and the second current-flow direction L2 alternately, so that the current of the DC-bus device 14 can flow alternately in the first current-flow direction L1 and the second current-flow direction L2. By having the switch device 16 at the DC positive end 151 as a typical example, the controller 17 would allow the current to flow alternately (1) from the DC-bus device 14 to the flywheel energy-storage device 15, and (2) from the flywheel energy-storage device 15 to the DC-bus device 14. However, to the switch device 16 at the DC negative end 152, then the current-flow directions are reverse to the aforesaid description. Namely, at this time, the first thryristor 161a of the switch device 16 and the second thryristor 161b thereof are alternately closed and opened, and thus the original bidirectional current in the current circuit 161 becomes a unidirectional current. Thereupon, the energy accessibility of the DC-bus device 14 can be limited. Anyhow, the flywheel energy-storage device 15 can still accelerate normally but with a smaller acceleration rate, and therefore anbenergy-accessing rate would be decreased. However, the operational stability of the DC-bus device 14 and the associated devices can be assured. Under this circumstance, the flywheel energy-storage device 15 can still continuously provide power to the power-supply end 12, and thus the aforesaid shortcoming in system instability caused by irregular charging/discharging of the flywheel energy-storage device 15 during a period of unstable voltages at the DC-bus device 14 can be substantially resolved. Similarly, if the flywheel energy-storage device 15 is in the deceleration mode, by having the switch device 16 at the DC positive end 151 as an example, the controller 17 allows the current to alternately flow from the DC-bus device 14 to the flywheel energy-storage device 15, and from the flywheel energy-storage device 15 to the DC-bus device 14. Further, the current through the switch device 16 at the DC negative end 152 flows in a reverse direction to that through the switch device 16 at the DC positive end 151.

In another embodiment, as shown in FIG. 1C, a flywheel energy-storage array F is included to provide two flywheel energy-storage devices 15. Each of the DC positive end 151 and the DC positive end 151 of the two flywheel energy-storage devices 15 is connected with a corresponding switch device 16. It shall be explained that the electric power-regulating system 10 of FIG. 1C is largely similar to any electric power-regulating system 10 of FIG. 1A and FIG. 1B. In these three embodiments, elements with the same function would be denoted by the same name and the same number, and thus details thereabout would be omitted herein. Within the operation range, the power regulator 13 and the flywheel energy-storage device 15 can access individually the capacitor energy of the DC-bus device 14. Each of the switch devices 16 works independently to provide individual acceleration or deceleration mode. Both the first current-flow direction L1 and the second current-flow direction L2 of each the switch device 16 are feasible. Namely, the thryristors of the switch device 16 allow bidirectional currents.

Then, determine whether or not a voltage of the DC-bus device 14 is too low. If the voltage of the DC-bus device 14 is too low (for example, less than a lower bound of the operation range), then the controller 17 needs to reduce the number of the flywheel energy-storage devices 15 that are in the acceleration mode, such that the energy captured from the capacitor of the DC-bus device 14 by the flywheel energy-storage device 15 can be reduced. Namely, those flywheel energy-storage devices 15 in the same acceleration mode are treated as a group. The aforesaid reduction in the number of the flywheel energy-storage devices 15 in the acceleration mode can be achieved by alternately opening or closing the first thryristors 161a and the second thryristors 161b of the switch devices 16 with respect to the corresponding flywheel energy-storage devices 15 in the acceleration mode. By having the switch device 16 at the DC positive end 151 as an example, the controller 17 allows the current to alternately flow from the DC-bus device 14 and from the flywheel energy-storage device 15 to the DC-bus device 14. At the same time, the flow through the switch device 16 at the DC negative end 152 is reverse to the flow through the switch device 16 at the DC positive end 151. By alternately opening or closing the first thryristors 161a and the second thryristors 161b of the switch devices 16 with respect to the corresponding flywheel energy-storage devices 15 in the acceleration mode, the energy captured from the capacitor of the DC-bus device 14 by the flywheel energy-storage device 15 can be reduced. Keep monitoring the voltage of the DC-bus device 14 till it is within the operation range. On the other hand, if the voltage of the DC-bus device 14 is too high (for example, higher than an upper bound of the operation range), then the controller 17 needs to reduce the number of the flywheel energy-storage devices 15 that are in the deceleration mode, such that the energy provided to the capacitor of the DC-bus device 14 from the flywheel energy-storage device 15 can be reduced. Namely, those flywheel energy-storage devices 15 in the same deceleration mode are treated as a group. The aforesaid reduction in the number of the flywheel energy-storage devices 15 in the deceleration mode can be achieved by alternately opening or closing the first thryristors 161a and the second thryristors 161b of the switch devices 16 with respect to the corresponding flywheel energy-storage devices 15 in the acceleration mode. By having the switch device 16 at the DC positive end 151 as an example, the controller 17 allows the current to alternately flow from the flywheel energy-storage device 15 to the DC-bus device 14 and from the DC-bus device 14 to the flywheel energy-storage device 15. At the same time, the flow through the switch device 16 at the DC negative end 152 is reverse to the flow through the switch device 16 at the DC positive end 151. By alternately opening or closing the first thryristors 161a and the second thryristors 161b of the switch devices 16 with respect to the corresponding flywheel energy-storage devices 15 in the deceleration mode, the energy provided to the capacitor of the DC-bus device 14 from the flywheel energy-storage device 15 can be reduced. Keep monitoring the voltage of the DC-bus device 14 till it is within the operation range.

Figure 4:
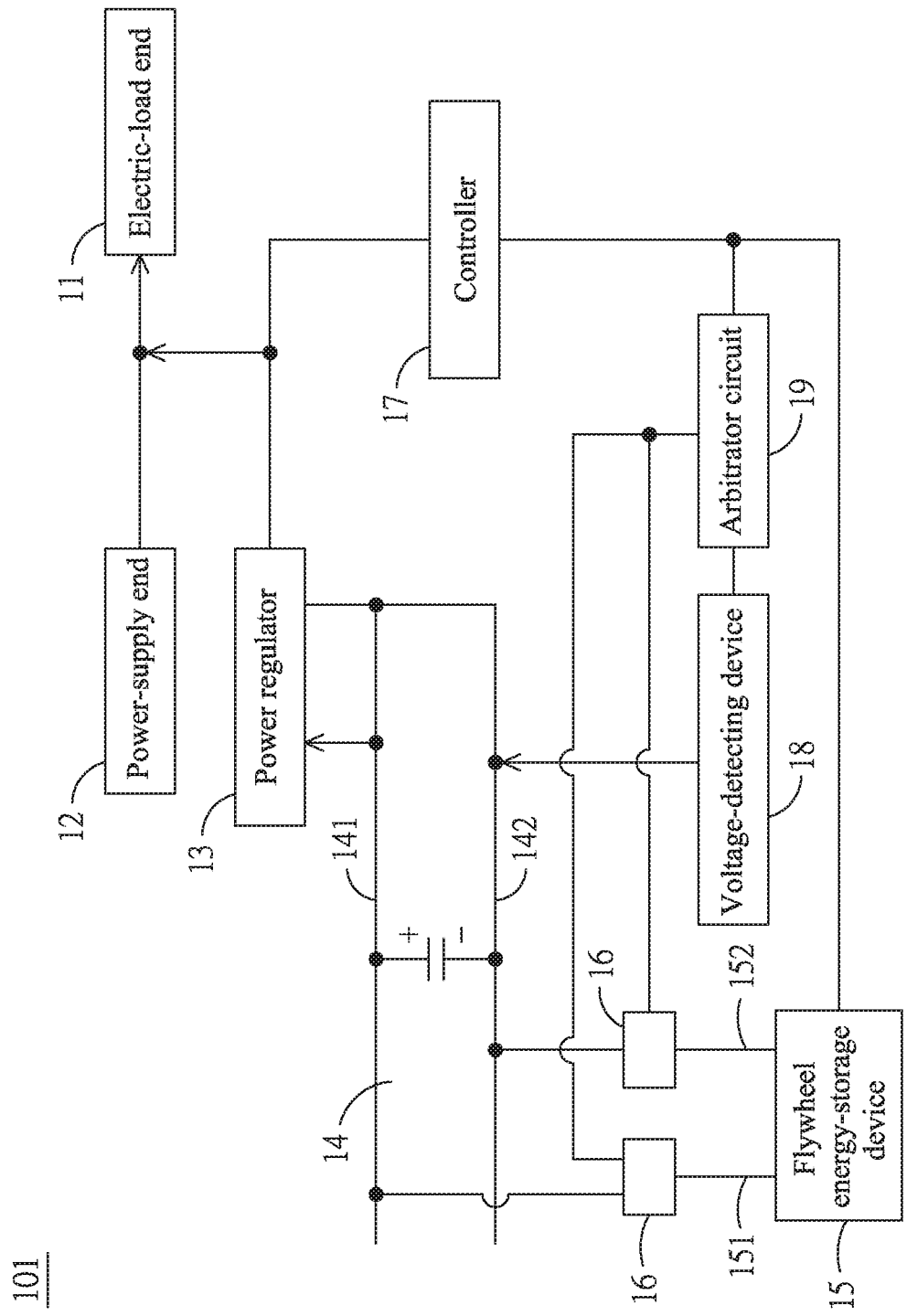
FIG. 4 is a schematic view of one more embodiment of the electric power-regulating system in accordance with this disclosure.

Refer now to FIG. 2 through FIG. 4, where FIG. 4 is a schematic view of one more embodiment of the electric power-regulating system in accordance with this disclosure. It shall be explained that the electric power-regulating system 101 of FIG. 4 is largely similar to any electric power-regulating system 10 of FIG. 1A to FIG. 1C. In all these embodiments, elements with the same function would be denoted by the same name and the same number, and thus details thereabout would be omitted herein. A major difference between the embodiments of FIG. 4 and FIG. 3 is that, in FIG. 4, the electric power-regulating system 101 further includes a voltage-detecting device 18 and an arbitrator circuit 19. The voltage-detecting device 18 is used for detecting the voltage of the DC-bus device 14. The arbitrator circuit 19 is coupled with the voltage-detecting device 18, the controller 17 and the at least one switch device 16. The controller 17 judges a flywheel status (an acceleration mode or a deceleration mode) of the flywheel rotor 153 of the flywheel energy-storage device 15 to issue a flywheel-status signal to the arbitrator circuit 19. According to the flywheel status, the arbitrator circuit 19 further generates a judgement signal to the corresponding switch devices 16. Then, the switch devices 16 would open or close at least one current-flow direction between the DC-bus device 14 and the corresponding flywheel energy-storage device 15 according to the judgement signal.

For example, within the operation range, both the power regulator 13 and the flywheel energy-storage device 15 can access the capacitor energy of the DC-bus device 14. The first current-flow direction L1 and the second current-flow direction L2 of the switch device 16 with respect to the DC positive end 151 and the DC negative end 152 are available. While the voltage-detecting device 18 detects that a voltage of the DC-bus device 14 exceeds an operation range, the voltage-detecting device 18 would transmit a corresponding voltage-status signal to the arbitrator circuit 19 according to the voltage status (high or low) at the DC-bus device 14.

If the arbitrator circuit 19 receives a voltage-status signal saying that the voltage at the DC-bus device 14 is too low (i.e., below a lower bound of the operation range), the arbitrator circuit 19 would output a judgement signal to the corresponding switch device 16. According to this judgement signal, the flywheel energy-storage device 15 in the acceleration mode would be allowed alternately to flow in and out of the current (for example, by switching on/off a DC gate circuit). Thus, the arbitrator circuit 19 issues the gate driver circuit 162 a signal to alternately cut off the first current-flow direction L1 and the second current-flow direction L2, and then the gate driver circuit 162 would alternately cut off the first current-flow direction L1 and the second current-flow direction L2 accordingly so as to have the current of the DC-bus device 14 to alternately flow in the first current-flow direction L1 and the second current-flow direction L2.

By having the switch device 16 at the DC positive end 151 as an example, the arbitrator circuit 19 would allow the current to alternately flow from the DC-bus device 14 to the flywheel energy-storage device 15 and from the flywheel energy-storage device 15 to the DC-bus device 14. At the same time, the current flowing through the switch device 16 at the DC negative end 152 is reverse to that through the switch device 16 at the DC positive end 151. In other words, at this time, the first thryristor 161a and the second thryristor 161b of the switch device 16 would be alternately opened and closed, so that the original bidirectional current at the current circuit 161 would now become a unidirectional current, and the energy accessibility through the DC-bus device 14 can be limited. Under this circumstance, though the flywheel energy-storage device 15 may still accelerate as normal, yet the acceleration rate would be much smaller, so that the related energy variation would be reduced without sacrificing the operational stability of the DC-bus device 14 and the associated devices. Also, in this state, the flywheel energy-storage device 15 can still continuously provide power to the power-supply end 12, and thus the aforesaid shortcoming in system instability caused by irregular charging/discharging of the flywheel energy-storage device 15 during a period of unstable voltages at the DC-bus device 14 can be substantially resolved. Thus, by alternately opening or closing the first thryristors 161a and the second thryristors 161b of the switch devices 16 with respect to the corresponding flywheel energy-storage devices 15 in the acceleration mode, the energy captured from the capacitor of the DC-bus device 14 by the flywheel energy-storage device 15 can be reduced. Keep monitoring the voltage of the DC-bus device 14 till it is within the operation range.

On the other hand, If the arbitrator circuit 19 receives a voltage-status signal saying that the voltage at the DC-bus device 14 is too high (i.e., over an upper bound of the operation range), the arbitrator circuit 19 would output a judgement signal to the corresponding switch device 16. According to this judgement signal, the flywheel energy-storage device 15 in the deceleration mode would be allowed alternately to flow in and out of the current (for example, by switching on/off a DC gate circuit). Thus, the arbitrator circuit 19 issues the gate driver circuit 162 a signal to alternately cut off the first current-flow direction L1 and the second current-flow direction L2, and then the gate driver circuit 162 would alternately cut off the first current-flow direction L1 and the second current-flow direction L2 accordingly so as to have the current of the DC-bus device 14 to alternately flow in the first current-flow direction L1 and the second current-flow direction L2.

By having the switch device 16 at the DC positive end 151 as an example, the arbitrator circuit 19 would allow the current to alternately flow from the flywheel energy-storage device 15 to the DC-bus device 14 and from the DC-bus device 14 to the flywheel energy-storage device 15. At the same time, the current flowing through the switch device 16 at the DC negative end 152 is reverse to that through the switch device 16 at the DC positive end 151. In other words, at this time, the first thryristor 161a and the second thryristor 161b of the switch device 16 would be alternately opened and closed, so that the original bidirectional current at the current circuit 161 would now become a unidirectional current, and the energy provided to the capacitor of the DC-bus device 14 from the flywheel energy-storage device 15 can be reduced. Thus, by alternately opening or closing the first thryristors 161a and the second thryristors 161b of the switch devices 16 with respect to the corresponding flywheel energy-storage devices 15 in the deceleration mode, the energy provided to charge the capacitor of the DC-bus device 14 from the flywheel energy-storage device 15 can be reduced. Keep monitoring the voltage of the DC-bus device 14 till it is within the operation range.

In some other embodiments, if more than two flywheel energy-storage devices 15 at a system similar to that of FIG. 4 (i e, similar to the flywheel energy-storage array F shown in FIG. 1C), then, within the operation range, the power regulator 13 and the flywheel energy-storage device 15 can access individually the capacitor energy of the DC-bus device 14. Each of the switch devices 16 works independently to provide individual acceleration or deceleration mode. Both the first current-flow direction L1 and the second current-flow direction L2 of each the switch device 16 are feasible. Namely, the thryristors of the switch device 16 allow bidirectional currents.

When the voltage-detecting device 18 detects that a voltage of the DC-bus device 14 exceeds an operation range, the voltage-detecting device 18 would transmit a corresponding voltage-status signal to the arbitrator circuit 19 according to the voltage status (high or low) at the DC-bus device 14. If the voltage of the DC-bus device 14 is less than the lower bound of the operation range, the arbitrator circuit 19 issues a judgement signal to the switch device 16 saying that the number of the flywheel energy-storage devices 15 in the acceleration mode needs to be reduced, such that the energy captured from the capacitor of the DC-bus device 14 by the flywheel energy-storage device 15 can be reduced. Thus, the arbitrator circuit 19 would treat those flywheel energy-storage devices 15 in the same acceleration mode as a group. The aforesaid reduction in the number of the flywheel energy-storage devices 15 in the acceleration mode can be achieved by alternately opening or closing the first thryristors 161a and the second thryristors 161b of the switch devices 16 with respect to the corresponding flywheel energy-storage devices 15 in the acceleration mode.

By having the switch device 16 at the DC positive end 151 as an example, the arbitrator circuit 19 would allow the current to alternately flow from the DC-bus device 14 to the flywheel energy-storage device 15 and from the flywheel energy-storage device 15 to the DC-bus device 14. At the same time, the current flowing through the switch device 16 at the DC negative end 152 is reverse to that through the switch device 16 at the DC positive end 151. By alternately opening or closing the first thryristors 161a and the second thryristors 161b of the switch devices 16 with respect to the corresponding flywheel energy-storage devices 15 in the acceleration mode, the energy captured from the capacitor of the DC-bus device 14 by the flywheel energy-storage device 15 can be reduced. Keep monitoring the voltage of the DC-bus device 14 till it is within the operation range.

On the other hand, if the voltage of the DC-bus device 14 is too high (i.e., over the upper bound of the operation range), then the number of the flywheel energy-storage devices 15 in the deceleration mode shall be reduced. Then, the arbitrator circuit 19 would treat those flywheel energy-storage devices 15 in the same deceleration mode as a group, and the aforesaid reduction in the number of the flywheel energy-storage devices 15 in the deceleration mode can be achieved by alternately opening or closing the first thryristors 161a and the second thryristors 161b of the switch devices 16 with respect to the corresponding flywheel energy-storage devices 15 in the deceleration mode. Keep monitoring the voltage of the DC-bus device 14 till it is within the operation range.

Figure 5:
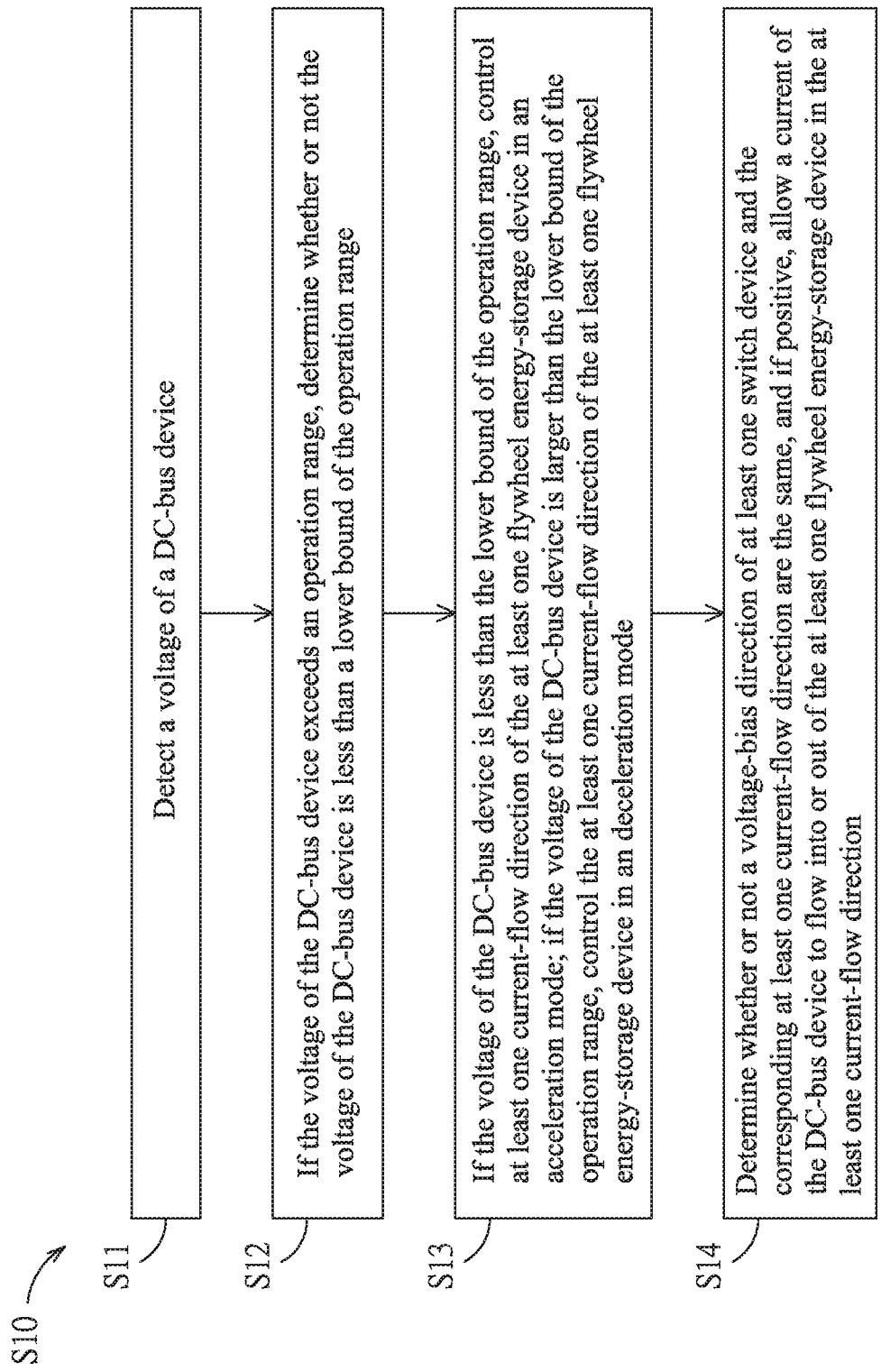
FIG. 5 is a flowchart of the preferred electric power-regulating method in accordance with this disclosure.

Referring now to FIG. 5, a flowchart of the preferred electric power-regulating method in accordance with this disclosure is provided. The preferred electric power-regulating method S100 as shown herein is applicable to each of the electric power-regulating systems 10, 101 in FIG. 1A, FIG. 1B, FIG. 1C and FIG. 4. The electric power-regulating method S100 includes the following Steps S11-S14.

Firstly, in any of the electric power-regulating systems 10, 101 of FIG. 1A, FIG. 1B, FIG. 1C and FIG. 4, within the operation range, the power regulator 13 (see FIG. 1A) and the flywheel energy-storage device 15 can individually access the capacitor energy of the DC-bus device 14, the controller 17 is used for controlling the flywheel energy-storage device 15 to pose in the acceleration mode or the deceleration mode, and also the controller 17 is used for controlling the power regulator 13. The first current-flow direction L1 and the second current-flow direction L2 are both available in the switch device 16. Namely, the thryristor of the switch device 16 allows bidirectional currents. In addition, as shown in FIG. 4, according to an operating state (in an acceleration mode or a deceleration mode) of a flywheel rotor 153 of the flywheel energy-storage device 15, the controller 17 would provide a flywheel-status signal to the arbitrator circuit 19.

Step S11: Detect a voltage of the DC-bus device 14. By having the electric power-regulating system 10 of FIG. 1A, FIG. 1B or FIG. 1C as an example, the controller 17 would be used to detect the voltage of the DC-bus device 14. In order to gain more reaction time for the electric power-regulating system, by having the electric power-regulating system 101 as an example, the voltage-detecting device 18 is introduced to detect the voltage of the DC-bus device 14 and further to transmit a voltage-status signal to the arbitrator circuit 19.

Then, perform Step S12. In this step, in the case that the voltage of the DC-bus device 14 exceeds an operation range, then determine whether or not the voltage of the DC-bus device 14 is below a lower bound of the operation range. On the other hand, in the case that the voltage of the DC-bus device 14 is within the operation range, the operation of the thryristors for the flywheel energy-storage device 15 is maintained, as shown in FIG. 3. The controller 17 performs to control the flywheel energy-storage device 15 to pose in the acceleration mode or the deceleration mode, and to control the power regulator 13 for regulating the power at the power-supply end 12. Also, keep detecting the voltage of the DC-bus device 14.

Step S13: If the voltage of the DC-bus device 14 is less than a lower bound of the operation range, at least one current-flow direction of the flywheel energy-storage device 15 in the acceleration mode should be controlled so as to reduce the capacitor energy of the DC-bus device 14 captured by the flywheel energy-storage device 15. In one embodiment, the aforesaid control can be achieved by alternately opening or closing the first thryristor 161*a* and the second thryristor 161*b* of the switch device 16 with respect to the corresponding flywheel energy-storage device 15 in the acceleration mode. On the other hand, if the voltage of the DC-bus device 14 is larger than an upper bound of the operation range, at least one current-flow direction of the flywheel energy-storage device 15 in the deceleration mode should be controlled so as to reduce the energy charged into the capacitor of the DC-bus device 14 from the flywheel energy-storage device 15. In one embodiment, the aforesaid control can be achieved by alternately opening or closing the first thryristor 161*a* and the second thryristor 161*b* of the switch device 16 with respect to the corresponding flywheel energy-storage device 15 in the deceleration mode. In addition, as shown in FIG. 4, the arbitrator circuit 19 can evaluate the flywheel status and the voltage status to further output a corresponding judgement signal to the respective switch device 16.

Then, perform Step S14. In this step, determine whether or not a voltage-bias direction of the switch device 16 and the corresponding at least one current-flow direction are the same. If positive, the controller 17 would allow the current of the DC-bus device 14 to flow into or out of the corresponding flywheel energy-storage device 15 according to the at least one current-flow direction (for example, by switching on/off a DC gate circuit). By having the electric power-regulating system 10 in any of FIG. 1A to FIG. 1C as an example, the controller 17 would selectively limit the at least one current-flow direction of the switch device 16, so that more reaction time for the electric power-regulating system can be obtained. By having the electric power-regulating system 101 of FIG. 4 as an example, the controller 17 would evaluate the acceleration or deceleration mode of a flywheel rotor 153 in the flywheel energy-storage device 15 to provide a flywheel-status signal to the arbitrator circuit 19, and then the arbitrator circuit 19 would judge the voltage status and the flywheel status of the flywheel energy-storage device 15 provided by the controller 17 to output a corresponding judgement signal to the respective switch device 16. Then, the switch device 16 would base on the judgement signal to open or close the at least one current-flow direction between the DC-bus device 14 and the corresponding flywheel energy-storage device 15. It shall be explained that, by having the electric power-regulating system 10 in any of FIG. 1A to FIG. 1C as an example, the aforesaid detection of the voltage status is performed by having the controller 17 to detect the voltage of the DC-bus device 14. In order to gain more reaction time for the electric power-regulating system, by having the electric power-regulating system 101 of FIG. 4 as an example, the voltage-detecting device 18 for detecting the voltage of the DC-bus device 14 would transmit a voltage-status signal to the arbitrator circuit 19.

In one embodiment, if the voltage status says that the voltage of the DC-bus device 14 is less than the lower bound of the operation range, the judgement signal would make possible the current to alternately flow into and out of the corresponding flywheel energy-storage device 15 in the acceleration mode (for example, by switching on/off a DC gate circuit), so as further to have the gate driver circuit 162 to alternately cut off the first current-flow direction L1 and the second current-flow direction L2, such that the current of the DC-bus device 14 can flow alternately in the first current-flow direction L1 and the second current-flow direction L2.

By having the switch device 16 at the DC positive end 151 as an example, the arbitrator circuit 19 allows the current to alternately flow from the flywheel energy-storage device 15 to the DC-bus device 14 and from the DC-bus device 14 to the flywheel energy-storage device 15. The current through the switch device 16 at the DC negative end 152 flows in a reverse direction to that through the switch device 16 at the DC positive end 151. On the other hand, if the voltage status says that the voltage of the DC-bus device 14 is higher than the upper bound of the operation range, the judgement signal would make possible the current to alternately flow into and out of the corresponding flywheel energy-storage device 15 in the deceleration mode (for example, by switching on/off a DC gate circuit).

In summary, the electric power-regulating system and the method thereof provided by this disclosure would limit the accessibility of the capacitor energy of the DC-bus device upon unstable voltages at the DC-bus device, such that the flywheel energy-storage device can accelerate as normal but with a smaller acceleration rate. Thereupon, the speed in accessing the capacitor energy would be reduced, without sacrificing the stability of the DC-bus device and the associated devices. Also, the continuity of the flywheel energy-storage device can be upheld to provide foreign power from the power-supply end, such that better power quality at the power-supply end can be assured, and thereby the aforesaid shortcoming in system instability caused by irregular charging/discharging of the flywheel energy-storage device during a period of unstable voltages at the DC-bus device can be substantially resolved.

Further, in order to provide more reaction time for the electric power-regulating system, the voltage-detecting device is introduced to detect the voltage of the DC-bus device, and the arbitrator circuit would evaluate the flywheel status and the voltage of the DC-bus device to output the judgement signal to the switch device, so as to control on/off of the switch device.

With respect to the above description then, it is to be realized that the optimum dimensional relationships for the parts of the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present disclosure.

What is claimed is:

1. An electric power-regulating system, comprising:
   an electric-load end;
   a power-supply end, for providing a power to the electric-load end;
   a power regulator, for regulating the power of the power-supply end;
   a DC-bus device, connecting the power regulator;
   at least one flywheel energy-storage device, connecting the DC-bus device;
   at least one switch device, connected between the at least one flywheel energy-storage device and the DC-bus device, wherein the at least one switch device controls at least one current-flow direction between the DC-bus device and the at least one flywheel energy-storage device;

a controller, for controlling the power regulator and the at least one flywheel energy-storage device;

a voltage-detecting device, for detecting the voltage of the DC-bus device; and an arbitrator circuit, coupling the voltage-detecting device, the controller and the at least one switch device, the voltage-detecting device transmitting a voltage-status signal to the arbitrator circuit, the controller evaluating an acceleration mode or a deceleration mode of a flywheel rotor of the at least one flywheel energy-storage device to provide a flywheel-status signal to the arbitrator circuit, the arbitrator circuit judging the flywheel status and the voltage status to output a judgement signal to the at least one switch device, the at least one switch device basing on the judgement signal to open or close the at least one current-flow direction between the DC-bus device and the one flywheel energy-storage device;

wherein, when a voltage of the DC-bus device exceeds an operation range, the controller selectively adjusts the at least one current-flow direction of the at least one switch device; wherein, when a voltage-bias direction of the at least one switch device and the at least one current-flow direction are the same, the controller allows a current of the DC-bus device to flow into or out of the at least one flywheel energy-storage device in the at least one current-flow direction.

2. The electric power-regulating system of claim 1, wherein the power regulator is comprised of one of an uninterruptible power system and a static synchronous compensator.

3. The electric power-regulating system of claim 1, wherein the power-supply end is selected from a group consisting of a grid, a municipal power, a renewable energy and a multi-source energy.

4. The electric power-regulating system of claim 1, wherein the at least one switch device includes a current circuit and a gate driver circuit, the current circuit including two thyristors in an antiparallel arrangement, the gate driver circuit being used for controlling on/off of thyristors.

5. The electric power-regulating system of claim 1, wherein a number of the at least one flywheel energy-storage device is one.

6. The electric power-regulating system of claim 1, wherein a number of the at least one flywheel energy-storage device is more than one.

7. The electric power-regulating system of claim 1, wherein the at least one switch device is connected with a DC positive end of the at least one flywheel energy-storage device.

8. The electric power-regulating system of claim 7, wherein the at least one switch device is connected with a DC negative end of the at least one flywheel energy-storage device.

9. An electric power-regulating method, comprising steps of:

(a) detecting a voltage of a DC-bus device;

(b) if the voltage of the DC-bus device exceeds an operation range, determining whether the voltage of the DC-bus device is less than a lower bound of the operation range;

(c) if the voltage of the DC-bus device is less than the lower bound of the operation range, controlling at least one current-flow direction of the at least one flywheel energy-storage device in an acceleration mode; if the voltage of the DC-bus device is larger than the lower bound of the operation range, controlling the at least one current-flow direction of the at least one flywheel energy-storage device in an deceleration mode; and (d) determining whether or not a voltage-bias direction of at least one switch device and the at least one current-flow direction are the same; if positive, allowing a current of the DC-bus device to flow into or out of the at least one flywheel energy-storage device in the at least one current-flow direction.

10. The electric power-regulating method of claim 9, wherein the at least one switch device includes a current circuit and a gate driver circuit, the current circuit including two thryristors in an antiparallel arrangement, the gate driver circuit being used for controlling on/off of thryristors.

11. The electric power-regulating method of claim 9, wherein the step (a) is to use a controller to detect the voltage of the DC-bus device.

12. The electric power-regulating method of claim 9, further including steps of:

(e) having a voltage-detecting device to detect the voltage of the DC-bus device, and further to transmit a voltage-status signal to an arbitrator circuit;

(f) according to an acceleration mode or a deceleration mode of a flywheel rotor of the flywheel energy-storage device, a controller providing a flywheel-status signal to the arbitrator circuit;

(g) the arbitrator circuit evaluating the flywheel status signal and the voltage status signal to output a judgement signal to the switch device; and (h) the at least one switch device basing on the judgement signal to open or close the at least one current-flow direction between the DC-bus device and the flywheel energy-storage device.

13. The electric power-regulating method of claim 12, wherein, when the voltage status signal indicates that the voltage of the DC-bus device is less than the lower bound of the operation range, the judgement signal is to have the flywheel energy-storage device in the acceleration mode to allow the current of the DC-bus device to alternately flow into and out of the flywheel energy-storage device.

14. The electric power-regulating method of claim 12, wherein, when the voltage status indicates that the voltage of the DC-bus device is larger than the upper bound of the operation range, the judgement signal is to have the flywheel energy-storage device in the deceleration mode to allow the current to alternately flow into and out of the flywheel energy-storage device.

15. The electric power-regulating system of claim 1, further comprising a first bus, wherein the power regulator regulates the power of the power-supply end via the first bus.

* * * * *